United States Patent

[11] 3,614,392

| [72] | Inventor | Konstantin Apel<br>Lehrenweg 8, Meersburg, Bodensee,<br>Germany |
|---|---|---|
| [21] | Appl. No. | 767,149 |
| [22] | Filed | Oct. 14, 1968 |
| [45] | Patented | Oct. 19, 1971 |
| [32] | Priority | Oct. 14, 1967 |
| [33] | | Germany |
| [31] | | P 16 15 310.9 |

[54] REGULATOR FOR A HEATER ELEMENT
19 Claims, 4 Drawing Figs.

[52] U.S. Cl. .................................................... 219/501
[51] Int. Cl. ....................................................... H05b 1/02
[50] Field of Search .......................................... 219/499,
448–453, 501; 323/75 N

[56] References Cited
UNITED STATES PATENTS
3,051,813   8/1962   Busch et al. .................   219/450

*Primary Examiner*—Bernard A. Gilheany
*Assistant Examiner*—F. E. Bell
*Attorney*—Waters, Roditi, Schwartz & Nissen ABSTRACT: A regulator for supplying control voltage to switch a heater on and off is provided with an OR gate, a control-voltage amplifier, a switching device, a temperature sensing device, and two independent control-voltage generators. One of the generators is connected to the temperature sensing device and the other is connected to power. The output of the control-voltage generators are connected through the OR gate and the control-voltage amplifier to the switching device. The switching device is in circuit with the heater to be controlled.

REGULATOR FOR A HEATER ELEMENT

The present invention relates to a regulator for heater elements, more particularly but not exclusively for use in hot plates.

Various devices already exist for maintaining the temperature of heating appliances as precisely as possible at a predetermined level.

In the case of electric hot plates, for instance, this purpose is served by pot-bottom sensors. To raise hot plates quickly from cold to a given operating temperature, rapid-heating devices are used. More expensive appliances rely on timing of the current feed.

These existing devices, however, have various drawbacks, The control response is slow, which results in a considerable degree of overshoot.

Adjustment of the preset temperature is not possible, so that the device is inaccurate in operation. The mechanical contacts used cause crackling interference.

An object of the present invention is to eliminate the drawbacks of such existing devices and to provide a regulator with which precise adjustment to predetermined temperature ranges can be effected, governed by a temperature sensor fitted in the vicinity of the heating element.

According to the present invention, there is provided a regulator for heater elements more particularly but not exclusively for use in hot plates, with a temperature sensor and with a variable resistor incorporated in a bridge circuit, supplying a control voltage by way of criterion for switching the heater elements on or off, comprising at least two control-voltage generators, one of which is associated, with temperature and the other with power, said control-voltage generators being connected through an OR gate to a control-voltage amplifier, which operates a switching device in circuit with the heating element to control the heat output.

Preferably the power control-voltage generator is provided with a rectifier and an integrator.

Conveniently, the integrator is provided with an active amplifier component in the form of a transistor.

According to another preferred feature of the invention, the control voltage amplifier is made up with semiconductors such as transistors.

The invention will now be further described, by way of example, with reference to the accompanying drawings, in which:

FIG. 4 shows a diagram of another arrangement, for obtaining the control voltage, providing a measure of the means heat output.

Figure 1:
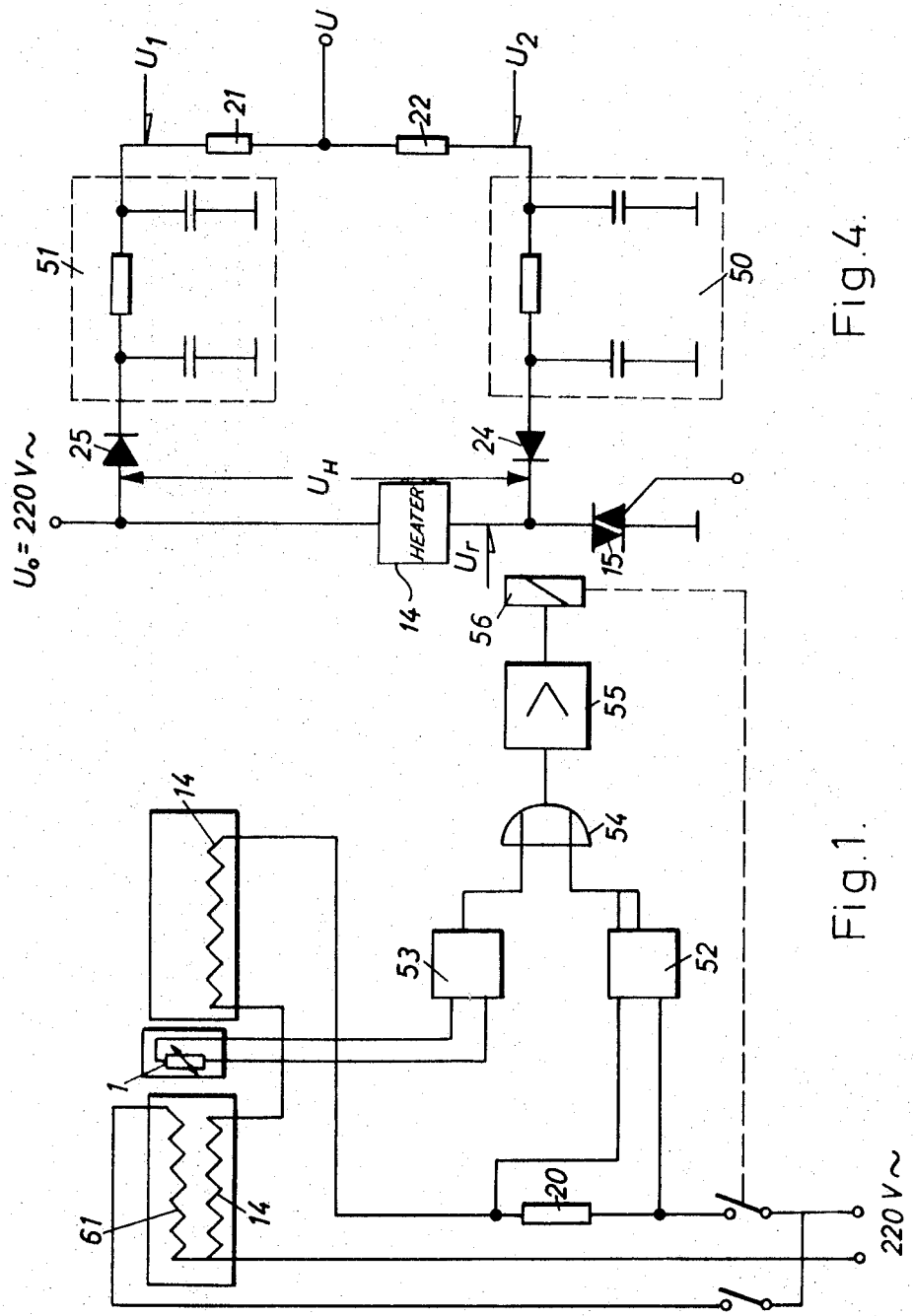
FIG. 1 is a diagram showing the general layout of the regulator.

The regulator (see FIGS. and 3) is fed with direct current by a main supply unit, 30. A pot-bottom sensor 1 and a variable resistor 2, connected in series with each other, form a bridge circuit with the full-wave rectifier in the main supply unit 30. The pot-bottom sensor 1, in the form of the resistor responsive to temperature changes, may be made, for example, of Ni-Fe wire.

The voltage arising between the pot-bottom sensor 1 and the variable resistor 2 passes through the diode 3 to the base of an NPN transistor, 7, operated as an emitter-base circuit, and is amplified and fed through the coupling resistor 10 to the base of a second NPN transistor, 13. This transistor 13 is joined via the feedback device 9 to the base of the first transistor 7. The feedback component 9 provides the two-stage amplifier circuit with trigger characteristics. The triggering action can be varied according to the rating of the feedback device 9. Through its emitter, the transistor 13 controls a triac, 15, connected in series with one heater element, 14, of a heating appliance. The diode 18, the cathode of which is joined to the base of the first transistor, 7, and diode 16, the anode of which is joined to the base of the second transistor 13, are connected (FIG. 2) through appropriate resistors, 19 and 17, to that side of the triac which is joined to the heater element 14, or directly to the mains.

From the voltages on the diodes 16 and 18, in conjunction with the phase-reversing action of the transistor 7, there also arises on the base of the transistor 13, for the actual regulation, a full-wave rectified voltage at mains frequencies. Superimposition of both voltages ensures that the energizing of the triac 15 always takes place precisely at the moment of the passage through zero of the voltage on it or of the main voltage.

A series resistor, 20, of a low rating compared to the heater element resistance, is connected to the heating resistor 14. The alternating voltage applied to it when the heater element 14 is in use is rectified and integrated by a Miller integrator, 26, in conjunction with the appropriate circuit components. The DC voltage then arising on the variable resistor 29 provides a measure of the mean current flowing in the heater element 14. If the mains voltage is assumed to be constant, then the voltage on the variable resistor 29 provides at the same time a measure of the mean value of the electric power consumed by the heater element. Part of the DC voltage on the resistor, tapped off via the slide of the variable resistor 29, is also fed by way of the resistor 6 and the diode 4 to the base of the first transistor 7 in the control amplifier 55. FIG. 1 diagrammatically illustrates the regulator arrangement according to the invention. The heater elements 14 here adjoin the power supply through the auxiliary contacts 60. A precision resistance 20 is situated in the lead of one of the heater elements. A prime control-voltage generator 53 for temperature obtains its voltage from a pot-bottom sensor 1. A second control-voltage generator 52 for power is connected to both ends of the precision resistance 20. The outputs of the two control-voltage generators 52, 53 are fed to an OR-gate 54, which passes its output signals on to a control-voltage amplifier 55. A control element 56, constituted of two antiparallel-connected thyristors is linked to this control-voltage amplifier 55. Further, a supplimentary heater element 61 is provided, which is connected in circuit by auxiliary contacts 60. This completes the circuit for controlling the heat output.

The triac 15 is switched through whenever the heat output is below the desired level preset with the aid of the variable resistors 2 and 29.

The two variable resistors 2 and 29 should preferably be mounted on a common operating spindle and should provide step-by-step adjustment. The variable resistor 29 has various switching positions in which the resistor 6 is separated from the variable resistor 29, the output regulation being out of action.

When used with an electric hot plate, the regulating device is provided, for example, with three ranges, each subdivided into a number of steps. These ranges may be, for instance, as follows:

1. Simmering

The power circuit is cut off the temperature can be varied with the variable resistor 2 from about 50° C. to 90° C.

2. Boiling

For low-temperature cooking, the variable resistor 2 is set to about 80° C.: and for higher performance, to just below boiling point. Until these preset temperatures are reached, the sensor 1 acts through the control amplifier 55 to provide full heat output. As soon as the right temperature is reached, the sensor 1 is cut off from the control amplifier by the diode 3. Thereafter the heat regulation is continued via the diode 4. A shift in the changeover temperature with power takes place in order to achieve smooth transition from rapid heating to cooking. Here diode 4 acts therefore in conjunction with diode 3 as an OR gate. The volatile (power-controlled) signal is accordingly fed to diode 4. In this case, diodes 3,4 therefore act like an OR gate, since they further determine (instantaneously) automatically and simultaneously, which input shall be put through.

3. Frying

This range corresponds in every way to the simmering range, except that the temperatures used are different, being approximately 120° C. to 250° C.

Figure 2:
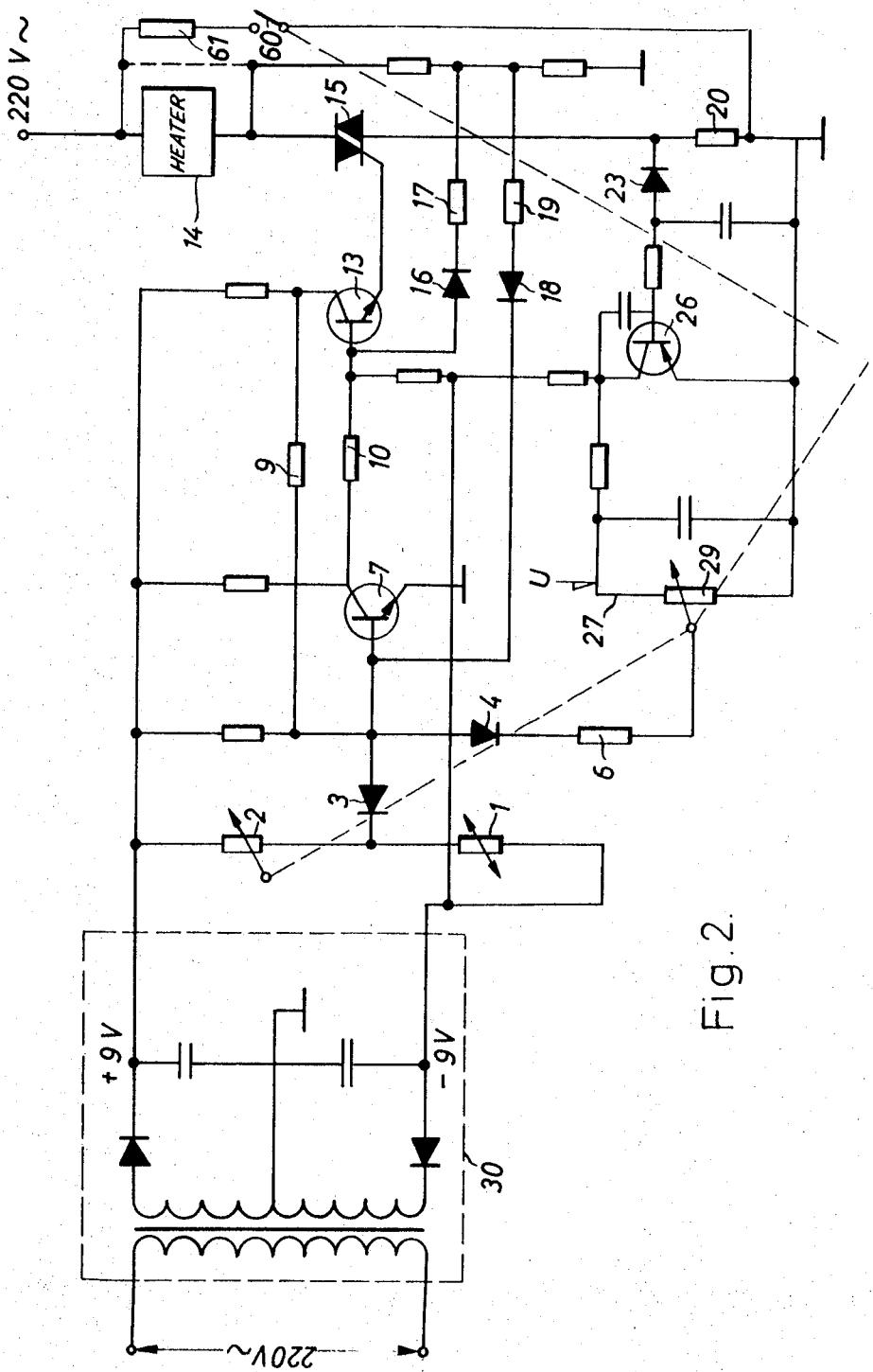
FIG. 2 is a diagram showing a regulator consisting substantially of a two-stage triggered amplifier and control-voltage generators for power and temperature.

In the arrangement shown in FIG. 2, the electrical power consumed by the heater element 14 varies linearly with fluctuations in the mains voltage.

Figure 3:
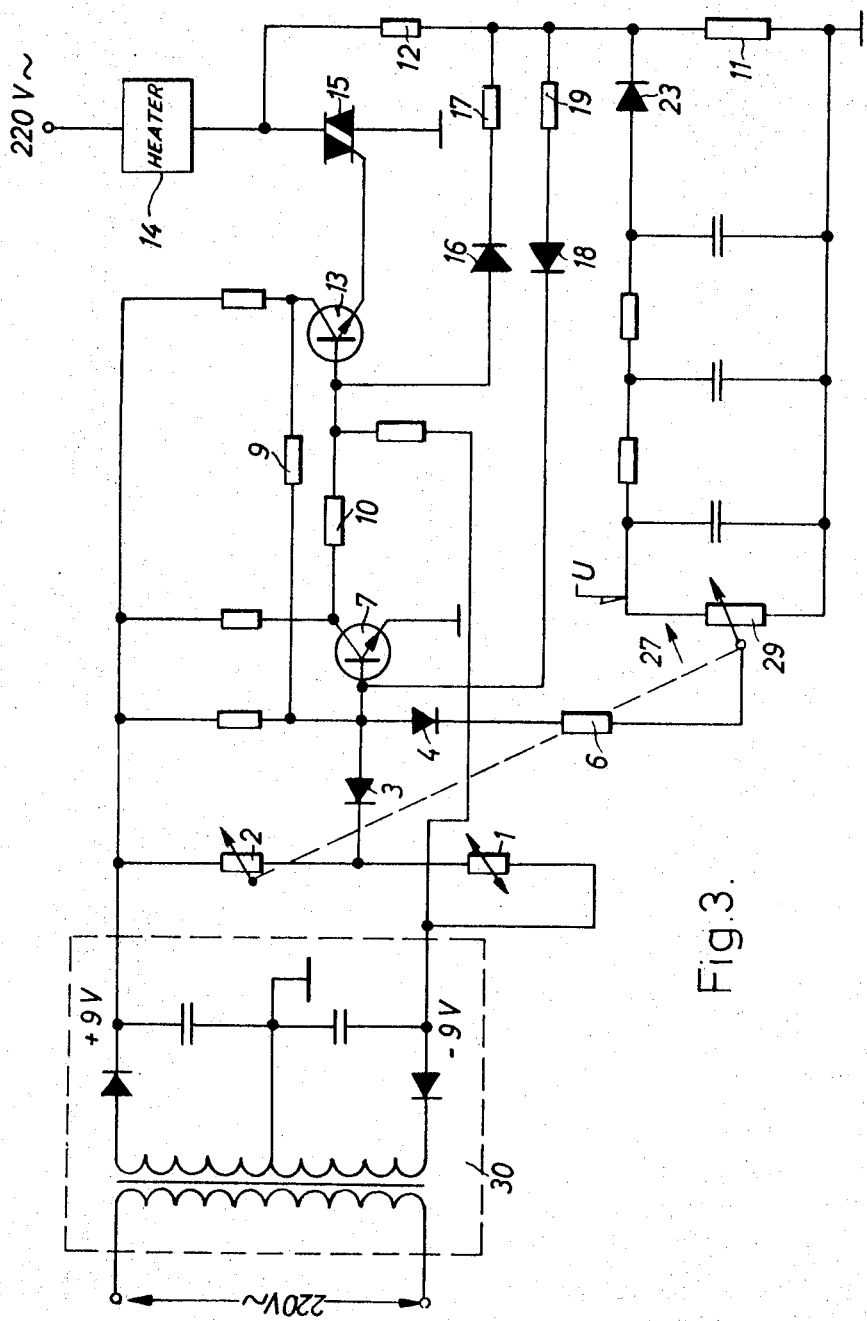
FIG. 3 is a diagram showing a somewhat simplified regulator of the type shown in FIG. 2, in which the power control-voltage generator comprises only passive components.

The difference between the arrangements shown in FIGS. 2 and 3 is that in the latter the control voltage is produced differently. For regulation, the voltage on the triac 15 is used. In this way, an active amplifier component in the integrator can be saved.

This shortcoming is avoided, however, in the layout shown in FIG. 4. This circuit again uses the voltage $U_r$ on the triac 15, which is rectified by the diode 24 and integrated by the integrator 50. To provide compensation for fluctuations in the mains voltage, a second integrator, 51, is connected directly to the mains voltage through the diode 25. The outputs of both integrators are joined through the resistors 21 and 22. The voltage U thus produced provides a measure of the mean value of the voltage on the heater element 14, so that the influence of fluctuations in mains voltage on the control voltage U is eliminated. Whereas the FIG. 2 embodiment covers a series arrangement of heater element 14 and precision resistance 20 in the FIG. 3 arrangement comprises a shunt connection wherein resistor element 14 can be rated for compensating, specifically as a low-impedance, compensating for resistance. In the circuit diagram according to FIG. 4, a mains voltage fluctuation compensation is obtained only for the steady voltage on variable resistance 29, that is, not for the heater currents.

The present invention has several advantages over the control devices known heretofore. The device enable predetermined temperature ranges to be maintained with greater precision than before. When rapid heating is applied to the stove plate, such overshoot as still occurs is very small. The smallest of temperature tolerances can be adhered to. The use of pot bottoms of different qualities has no adverse effect on the fluctuating of the automatic equipment. All cooking temperature ranges can be conveniently preset by single-knob switch operation. In addition, there is smooth transition from rapid heating to cooking conditions.

I claim:

1. A regulator for a heater element for use in thermal apparatus having a power supply and a temperature sensor in a bridge circuit, said regulator being adapted for supplying a control voltage as a criterion for switching the heater element on or off, said regulator comprising an OR gate, a control-voltage generators, one of which is independently operatively associated with said temperature sensor and the other with power, the output of each of said control-voltage generators being connected to said OR gate and the output of said OR gate being connected to said control-voltage amplifier, said amplifier being connected to said switching device for operating said switching device, said switching device being in circuit with the heating element to control heat output.

2. A regulator as claimed in claim 1, in which the power control-voltage generator includes a rectifier and an integrator coupled thereto.

3. A regulator as claimed in claim 2, in which the integrator includes an active amplifier component in the form of a transistor.

4. A regulator as claimed in claim 1, in which the control-voltage amplifier is a semiconductor circuit.

5. A regulator as claimed in claim 1, in which said amplifier includes first and second transistors each including a base, emitter and collector and in which the collector of the second transistor of the amplifier is connected to the base of the first transistor of the amplifier in a feedback arrangement to constitute a circuit with trigger characteristics.

6. A regulator as claimed in claim 1 comprising a variable resistor, a resistor and a diode and in which the power control-voltage generator is coupled to the amplifier through said variable resistor, resistor and diode.

7. In combination with a regulator as claimed in claim 1, a circuit comprising said temperature sensor constituted as a pot-bottom sensor, a variable resistor, and a full-wave rectifier coupled to form a bridge circuit.

8. A circuit as claimed in claim 7 comprising a diode and in which the pot-bottom sensor and the variable resistor are connected through said diode to the amplifier.

9. A regulator as claimed in claim 1 in which the control amplifier is an NPN transistor circuit.

10. A regulator as claimed in claim 5 comprising a diode and a resistor and in which the cathode of the diode, the anode of which is coupled to the base of the second transistor, is connected through said resistor to a junction point between the switching device and the heating element.

11. A regulator as claimed in claim 5 comprising a diode and a resistor and in which the anode of the diode, the cathode of which is joined to the base of the first transistor, is connected through said resistor to a junction point between the switching device and the heating element.

12. A circuit as claimed in claim 7 in which the variable resistor is incrementally adjustable.

13. A regulator as claimed in claim 6 in which the variable resistor coupled to the power control-voltage generator is of a construction such that in at least one position the operative connections thereof to the diode are interrupted.

14. A circuit as claimed in claim 7 in which the variable resistor coupled to the power control-voltage generator is of a construction such that in at least one position the operative connections thereof to the diode are interrupted, and in which both variable resistors have a common operating spindle.

15. A circuit as claimed in claim 7, in which the pot-bottom sensor is of wire having a high temperature coefficient.

16. A regulator as claimed in claim 1, in which the switching device is a triac.

17. A regulator as claimed in claim 1, in which the switching device includes two thyristors.

18. A regulator as claimed in claim 14 comprising an extra contact adapted for connecting in an additional heating element is fitted to the common operating spindle of the variable resistors.

19. A regulator as claimed in claim 16 comprising a first and a second diode, a first and a second integrator, a first and second resistor, and wherein between the triac and the heating element is said first diode connected to said first integrator, the output of which is coupled to said first resistor, and wherein said second diode is connected to said power supply and operates on said second integrator connected through said second resistor to said first resistor.